US012803156B2

(12) United States Patent
Baek et al.

(10) Patent No.: US 12,803,156 B2

(45) Date of Patent: Nov. 17, 2026

(54) ANTENNA FOR VEHICLE

(71) Applicants: Hyundai Motor Company, Seoul (KR); Kia Corporation, Seoul (KR); ACE ANTENNA CORP., Incheon (KR)

(72) Inventors: Ji Soo Baek, Hwaseong-si (KR); Tae Il Kim, Goyang-si (KR); Sang Pil Kang, Incheon (KR); Sang Ho Lee, Hwaseong-si (KR); Se Yung Park, Seoul (KR); Jin Kyu Hwang, Incheon (KR); Seung Bok Byun, Incheon (KR); Sang Un Na, Incheon (KR)

(73) Assignees: HYUNDAI MOTOR COMPANY, Seoul (KR); KIA CORPORATION, Seoul (KR); ACE ANTENNA CORP., Incheon (KR)

( * ) Notice: Subject to any disclaimer, the term of this patent is extended or adjusted under 35 U.S.C. 154(b) by 34 days.

(21) Appl. No.: 18/956,533

(22) Filed: Nov. 22, 2024

(65) Prior Publication Data

US 2025/0202099 A1 Jun. 19, 2025

(30) Foreign Application Priority Data

Dec. 19, 2023 (KR) ........................ 10-2023-0185810

(51) Int. Cl.

*H01Q 1/32* (2006.01)
*H01Q 1/42* (2006.01)
*H01Q 5/371* (2015.01)

(52) U.S. Cl.

CPC ............. *H01Q 1/3275* (2013.01); *H01Q 1/42* (2013.01); *H01Q 5/371* (2015.01)

(58) Field of Classification Search

CPC ......... H01Q 1/3275; H01Q 1/42; H01Q 5/371

See application file for complete search history.

(56) References Cited

U.S. PATENT DOCUMENTS

| | | | | |
|---|---|---|---|---|
| 9,595,752 B2 * | 3/2017 | Kaneko | H01Q 1/3275 | |
| 2014/0125531 A1 * | 5/2014 | Kaneko | H01Q 1/3275 343/713 | |
| 2016/0218430 A1 * | 7/2016 | Park | H01Q 1/3275 | |
| 2022/0255213 A1 * | 8/2022 | Ryu | H01Q 21/28 | |
| 2023/0058867 A1 * | 2/2023 | Park | H01Q 1/38 | |

* cited by examiner

*Primary Examiner* — Hai V Tran

(74) *Attorney, Agent, or Firm* — Morgan, Lewis & Bockius LLP

(57) ABSTRACT

An antenna for a vehicle including: a base; a substrate disposed on an upper part of the base and on which feed lines are formed; a first antenna frame coupled to one side of an upper part of the substrate; and a first radiator disposed on an upper part of the first antenna frame and in which slits are formed, wherein the first antenna frame includes: a first radiator coupling portion supporting a lower part of the first radiator; and a plurality of supports extending downward from the lower part of the first radiator coupling portion and coupling to the substrate.

18 Claims, 10 Drawing Sheets

ANTENNA FOR VEHICLE

CROSS-REFERENCE TO RELATED APPLICATIONS

The present application claims priority to Patent Application No. 10-2023-0185810, filed on Dec. 19, 2023 in Korea, the entire contents of which are incorporated herein by reference.

TECHNICAL FIELD

The present disclosure relates to an antenna for a vehicle.

BACKGROUND

The content described below simply provides background information related to the present embodiment and does not constitute the prior art.

As communication systems continue to advance, the range of communication services offered through vehicles is also expanding. Conventional vehicles commonly received FM/AM signals; however, various types of services based on the DMB/DAB, GNSS, 5G, and LTE are required to be provided through vehicles.

As the range of services provided through vehicles has become more diverse, a single antenna has proven inadequate for transmitting and receiving signals across various frequency bands, and for this reason, antennas installed on the roof of a vehicle have been utilized. Antennas installed on the vehicle roof are often manufactured in a shape similar to the shark fin; hence, they are also called shark fin antennas.

The antenna on the vehicle roof mainly used a radiator fabricated by etching a metal pattern on a PCB. The antenna installed on the vehicle roof employs a structure in which a base board is mounted, a PCB is vertically coupled to the base board, and a metal pattern formed on the vertically coupled PCB serves as the radiator.

However, radiators built on the structure above exhibit limitations in transmitting and receiving signals across diverse frequency bands and moreover, increase the manufacturing costs. As various types of radiators are disposed in a limited space, interference between radiators arises, acting as a major cause of the performance degradation of antennas mounted on the vehicle roof.

In addition, since multiple radiators are all formed on vertically combined PCBs, a large number of PCBs are required, which makes it difficult to reduce costs for securing an appropriate arrangement structure.

SUMMARY

An object of the present disclosure is to provide a multi-frequency band antenna structure which does not use PCBs as radiators, thereby reducing manufacturing costs.

Also, an object of the present disclosure is to provide a multi-frequency band antenna structure which ensures a predetermined level of separation between radiators when a plurality of radiators are used.

Technical objects to be achieved by the present disclosure are not limited to those described above, and other technical objects not mentioned above may also be clearly understood from the descriptions given below by those skilled in the art to which the present disclosure belongs.

An antenna for a vehicle comprising: a base; a substrate disposed on an upper part of the base and on which feed lines are formed; a first antenna frame coupled to one side of an upper part of the substrate; and a first radiator disposed on an upper part of the first antenna frame and in which slits are formed, wherein the first antenna frame includes: a first radiator coupling portion supporting a lower part of the first radiator; and a plurality of supports extending downward from the lower part of the first radiator coupling portion and coupling to the substrate.

A method for manufacturing a vehicle antenna, the method comprising: disposing a substrate on an upper part of a base; coupling a patch antenna to an upper part of the substrate; coupling a second radiator to a horizontal fixing portion, a substrate fixing portion, and a second radiator fitting portion formed in a first antenna frame; fixing the first antenna frame to the substrate by coupling a first hook of the substrate fixing portion formed on the first antenna frame to the substrate; seating flanges formed in the first antenna frame in flange grooves formed by recessing downward from an upper surface of the substrate; and fastening first screws to penetrate each of the flanges, each of the flange grooves, and one surface of the base.

As described above, according to the present disclosure, vehicle antennas may be manufactured at reduced costs by eliminating the use of PCBs for the radiator function, employ a plurality of radiators, and ensure a predetermined level of separation between radiators when a plurality of radiators are employed.

DETAILED DESCRIPTION

Figure 1:
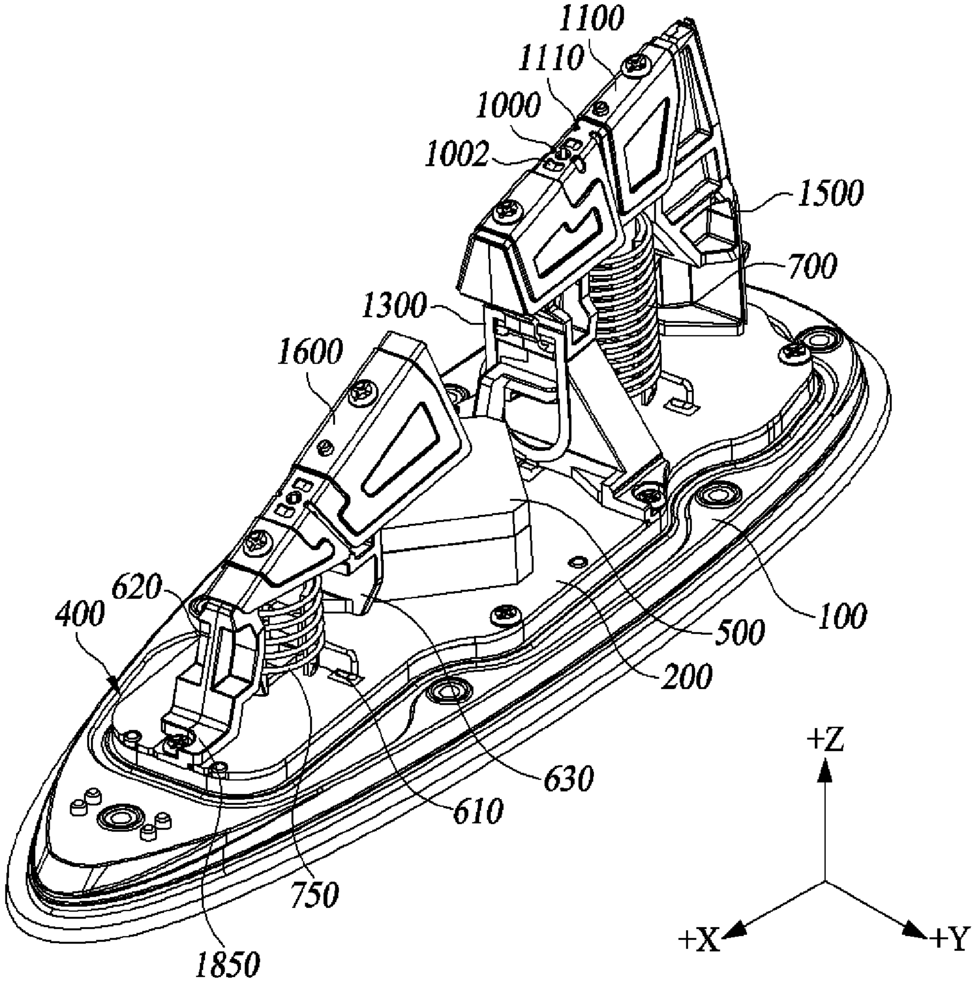
FIGS. 1 and 2 are perspective drawings of a vehicle antenna according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Figure 3:
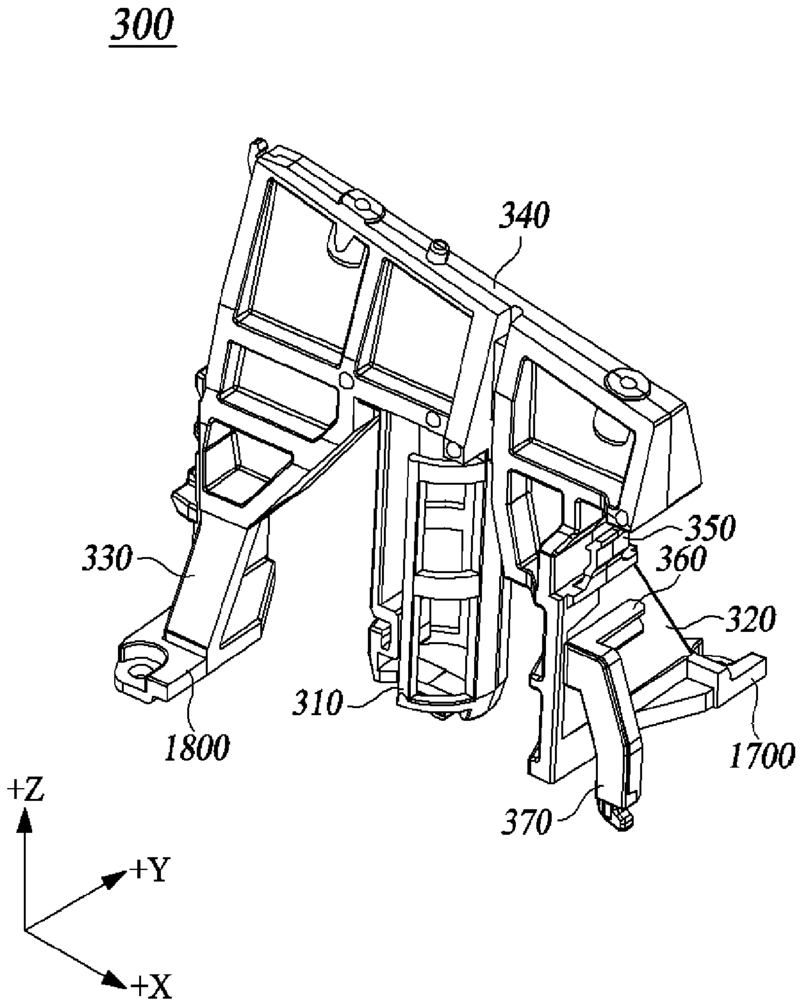
FIG. 3 is a perspective drawing of a first antenna frame according to one embodiment of the present disclosure.

Define directions as follows: The x, y, and z axes depicted in FIG. 1 are each indicative of mutually perpendicular directions. The x, y, and z axes depicted in FIG. 3 represent the same axes as those shown in FIG. 1 for the x, y, and z axes, respectively. The horizontal direction is either the +y direction or the −y direction. The left direction corresponds to the ty direction. The right direction corresponds to the −y direction. The height direction corresponds to the +z direction. The forward direction corresponds to the +x direction.

Figure 2:
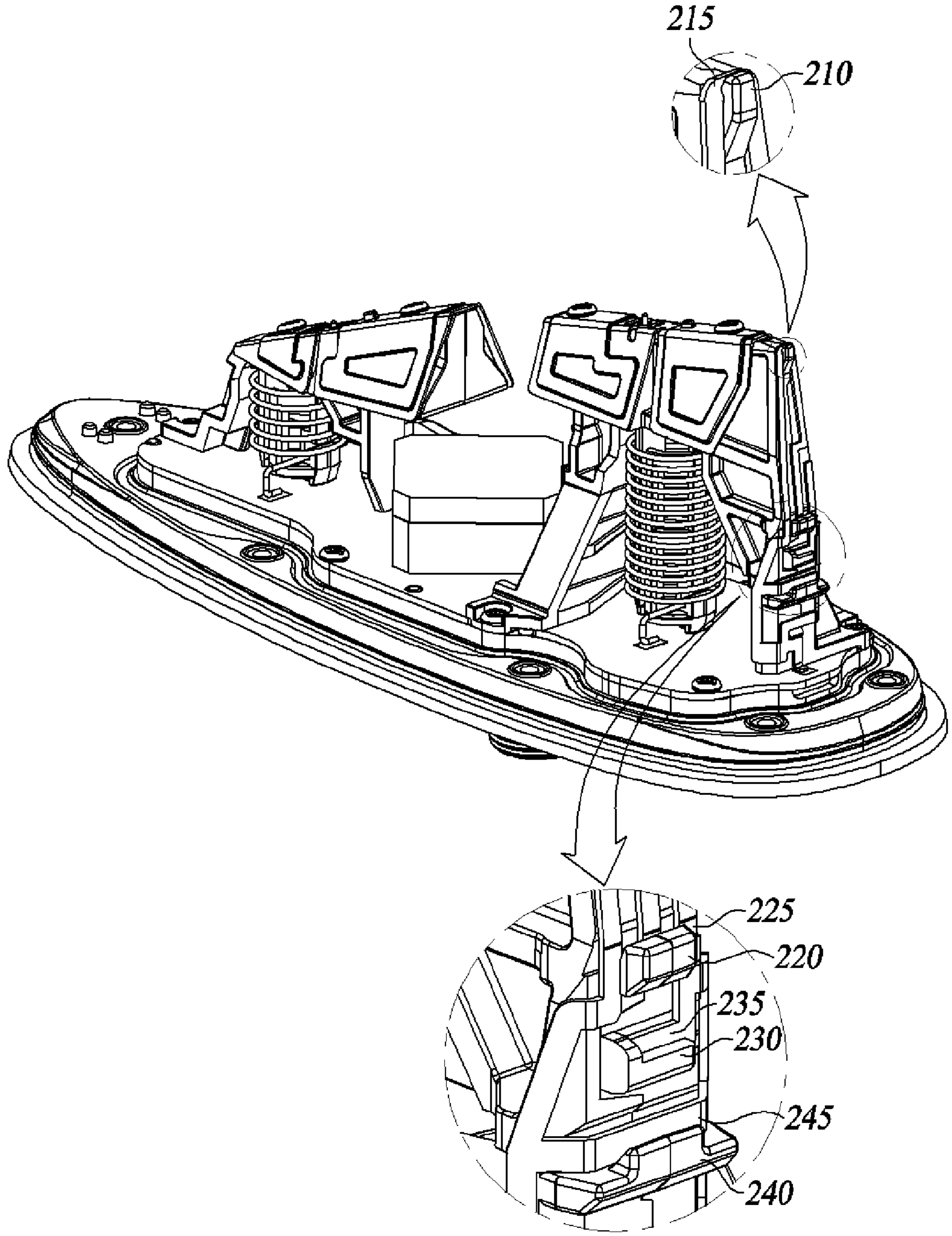

FIGS. 1 and 2 are perspective drawings of a vehicle antenna according to one embodiment of the present disclosure.

FIG. 3 is a perspective drawing of a first antenna frame according to one embodiment of the present disclosure.

Figure 4:
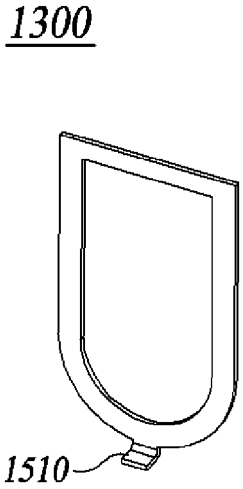
FIG. 4 is a perspective drawing of a second radiator according to one embodiment of the present disclosure.

FIG. 4 is a perspective drawing of a second radiator according to one embodiment of the present disclosure.

Figure 5:
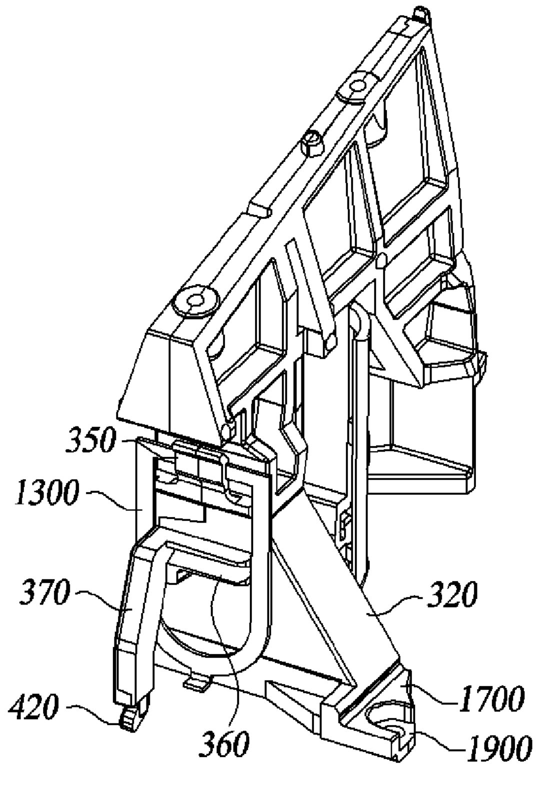
FIG. 5 illustrates a coupling structure of a second radiator and a second support according to one embodiment of the present disclosure.

FIG. 5 illustrates a coupling structure of a second radiator and a second support according to one embodiment of the present disclosure.

Figure 6:
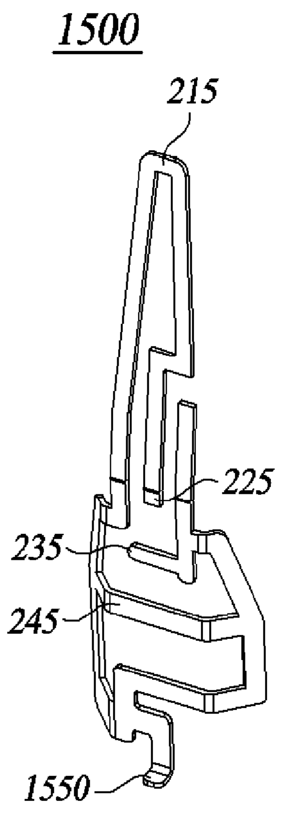
FIG. 6 illustrates a third radiator according to one embodiment of the present disclosure.

FIG. 6 illustrates a third radiator according to one embodiment of the present disclosure.

Figure 7:
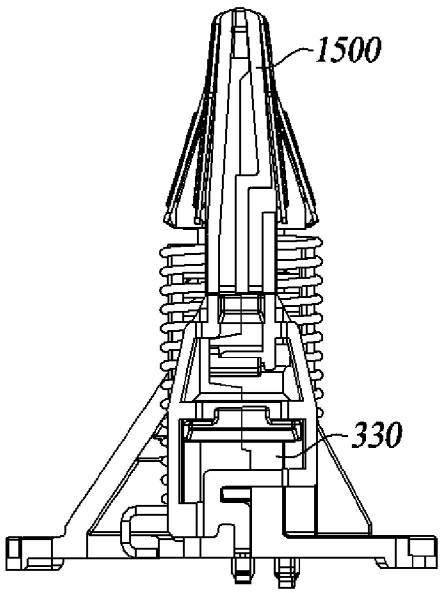
FIGS. 7 and 8 illustrate a coupling structure of a third radiator and a third support according to one embodiment of the present disclosure.
Figure 8:
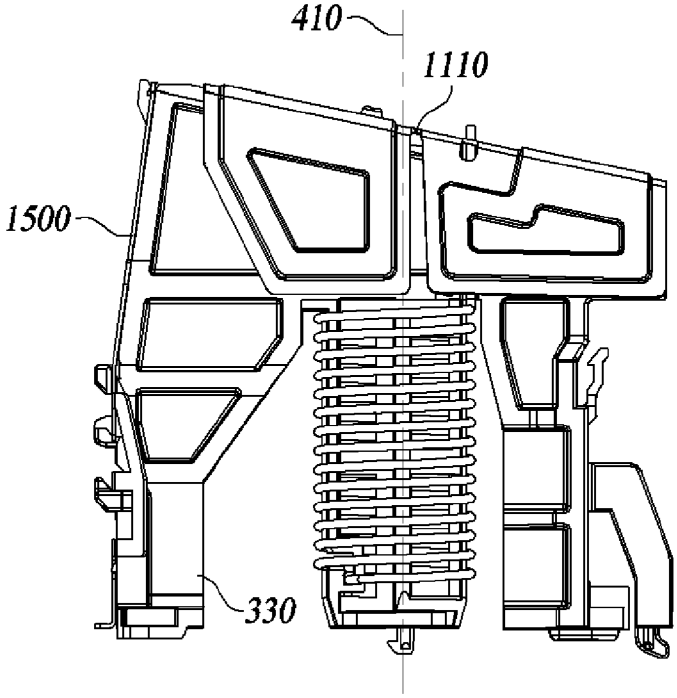

FIGS. 7 and 8 illustrate a coupling structure of a third radiator and a third support according to one embodiment of the present disclosure.

Figure 9:
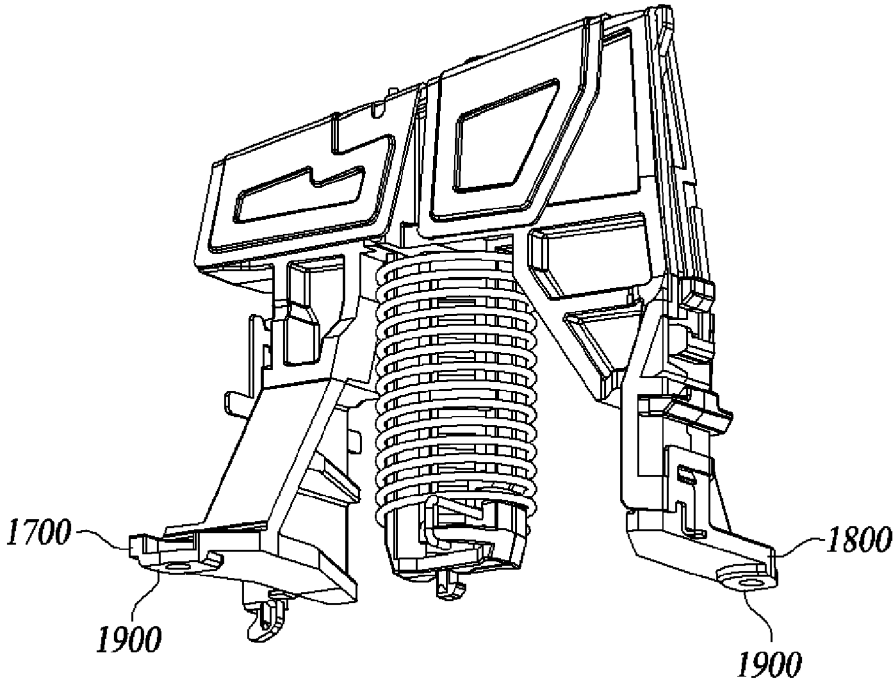
FIG. 9 illustrates support legs and flanges formed in the first antenna frame according to one embodiment of the present disclosure.

FIG. 9 illustrates support legs and flanges formed in the first antenna frame according to one embodiment of the present disclosure.

Figure 10:
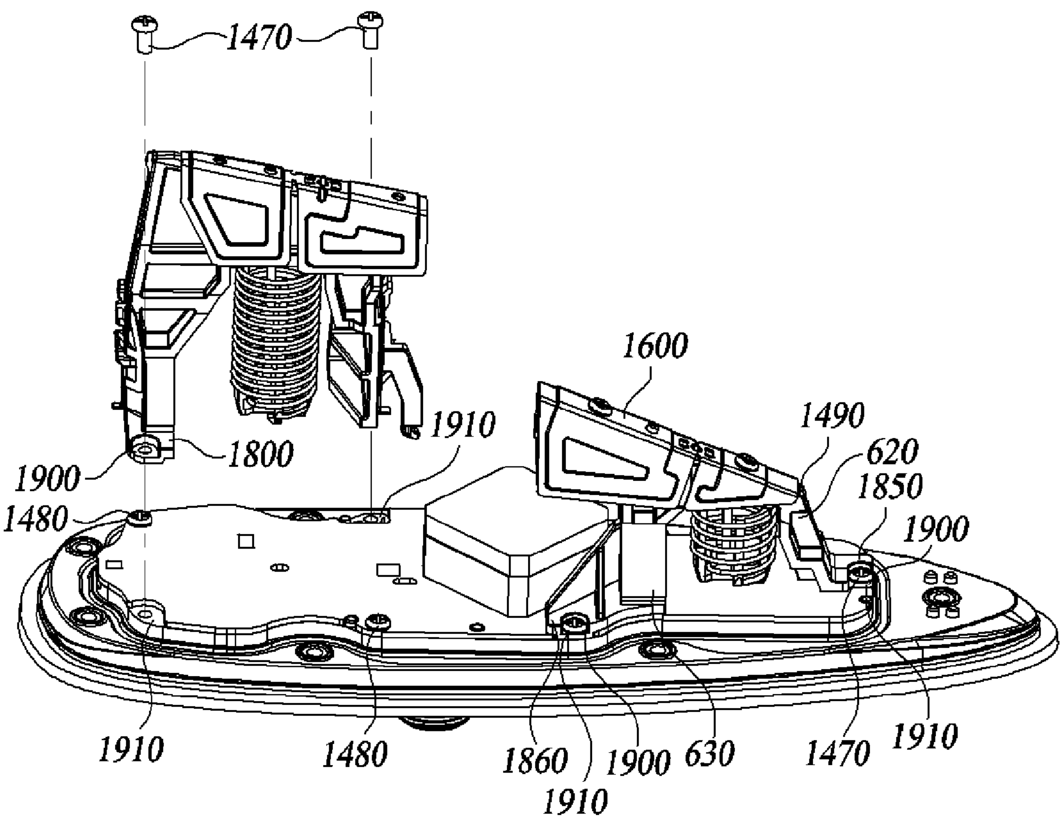
FIG. 10 illustrates a process for coupling an antenna frame to a substrate according to one embodiment of the present disclosure.

FIG. 10 illustrates a process for coupling an antenna frame to a substrate according to one embodiment of the present disclosure.

Referring to FIGS. 1 to 10, a vehicle antenna according to one embodiment of the present disclosure may comprise a base 100, a substrate 200, a first antenna frame 300, a second antenna frame 400, a patch antenna 500, radiators 1100, 1300, 1500, 1600, a first radiator extension 700, and a fourth radiator extension 750. The patch antenna 500 typically employs a ceramic patch-type antenna. According to one embodiment, the vehicle antenna may be disposed on the roof of the vehicle.

In FIGS. 1 and 2, a housing that protects the elements shown in FIGS. 1 and 2 is shown, and a shark fin-shaped housing may be coupled to the vehicle antenna according to one embodiment of the present disclosure. However, the shape of the housing is not limited to the shark fin shape.

The base 100, together with the housing, functions to protect the elements of the vehicle antenna according to one embodiment of the present disclosure. Elements of a vehicle antenna according to one embodiment of the present disclosure are fixed on the base 100 and/or the substrate 200.

The substrate 200 is placed on the base 100. For example, the substrate 200 may be a PCB but is not limited thereto. A circuit for feeding power to the antenna may be formed on the upper part of the substrate 200, and a ground plane may be formed on the lower part of the substrate 200. For example, feed lines that provide feed signals are formed on the substrate 200, and the formed feed lines are electrically connected to radiators coupled to the first antenna frame 300 and the second antenna frame 400 to provide feed signals to the radiators.

The first antenna frame 300 is fixed on the substrate 200. The first antenna frame 300 is a frame for fixing a plurality of radiators, and the first antenna frame 300 may be made of a dielectric material such as plastic.

Recently, vehicle antennas are required to be equipped with radiators operating across diverse frequency bands. Since various services are provided through vehicle communication, it is essential for vehicle communication to support services based on the AM/FM, DMB/DAB, GNSS, 5G, and LTE. It is a challenging task to embed all these radiators operating across diverse frequency bands into the vehicle antenna, and the first antenna frame 300 and/or the second antenna frame 400 are used to facilitate the embedding of a plurality of radiators within the vehicle antenna in an appropriate structure.

According to one embodiment of the present disclosure, radiators operating across diverse frequency bands, for example, three radiators operating in the AM/FM, 5G, and LTE bands, may be coupled thereto. It should be clearly understood by those skilled in the art that the example above has been introduced for an illustrative purpose, and radiators operating across diverse frequency bands may be coupled to the first antenna frame 300.

The second antenna frame 400 is fixed on the substrate 200, and radiators may also be coupled to the second antenna frame 400.

The radiators coupled to the second antenna frame 400 may have different service bands from the radiators coupled to the first antenna frame 300. Also, a plurality of radiators may be coupled to the second antenna frame 400. For example, a radiator operating in the DMB band may be coupled to the second antenna frame 400. It should be clearly understood that the specific example has been introduced for an illustrative purpose, and radiators operating across diverse frequency bands may also be coupled to the second antenna frame 400.

The patch antenna 500 may be disposed between the first antenna frame 300 and the second antenna frame 400. According to one embodiment of the present disclosure, the patch antenna 500 may be an antenna for the GPS band. According to one embodiment, the patch antenna 500 may use the L, L1, and L5 bands.

In the case of a patch antenna, additional frequency bandwidth of approximately 34 MHz has been secured by raising the height compared to conventional patch antennas with similar specifications and adjusting the hybrid coupler time constant. In other words, the resulting frequency band spans from 1164 to 1188 MHz and from 1525 to 1605 MHz.

According to a preferred embodiment of the present disclosure, the second antenna frame 400 is disposed in front of the vehicle antenna and the first antenna frame 300 is disposed in the rear of the vehicle antenna, and the first antenna frame 300 and a patch antenna 500 is disposed between the second antenna frame 400.

Since the vehicle antenna has a structure in which the height increases from the front to the rear, the patch antenna 500 is typically placed at the front. However, when the patch antenna is placed at the front, the level of separation between the radiators is not properly secured when a plurality of radiators operating across diverse frequency bands are built into one vehicle antenna.

The patch antenna has a different form from the radiators coupled to the antenna frames 300 and 400, and to ensure a proper level of separation between radiators, it is preferable that the patch antenna is placed between the frames 300 and 400. In other words, by placing the patch antenna 500 between the first antenna frame 300 and the second antenna frame 400, the radiators coupled to the first antenna frame 300 may be separated from the radiators coupled to the second antenna frame 400.

Since the patch antenna and the radiators coupled to the antenna frame are relatively immune to interference, optimal separation may be achieved when the patch antenna 500 is placed between the two antenna frames 300 and 400.

One of the features of the present disclosure lies in the structure of the first antenna frame 300. According to one embodiment of the present disclosure, three radiators may be coupled to the first antenna frame 300. This structure is especially suitable for radiators designed for the low-frequency AM/FM band.

The size of the radiator is inversely proportional to the frequency band of the antenna, and it is common for antennas dedicated to low-frequency bands to necessitate a larger radiator.

The present disclosure provides a first antenna frame structure in which radiators operating across diverse frequency bands are coupled to the antenna frame. For example, a first antenna frame structure may be formed, in which radiators operating in the low-frequency bands such as the AM/FM band may be effectively coupled to the antenna frame.

Referring to FIGS. 1 to 3, the first antenna frame 300 according to one embodiment of the present disclosure may include a first support 310, a second support 320, a third support 330, a first radiator coupling portion 340, a second radiator fitting portion 350, a horizontal fixing portion 360, and a substrate fixing portion 370.

The first radiator 1100 is coupled to the first radiator coupling portion 340. The first radiator coupling portion 340 may have an inclined structure, characterized by an inclined top. Since the exterior shape of the vehicle antenna has a structure with an ascending height from the front to the rear, the first radiator coupling portion 340 also has a structure with the height increasing from the front to the rear.

Three supports 310, 320, 330 are coupled to the first radiator coupling portion 340; each support 310, 320, 330 is coupled to the substrate 200, fixing the first antenna frame 300 to the substrate 200.

A first radiator extension 700 that functions as a radiator together with the first radiator 1100 may be coupled to the outer circumferential surface of the first support 310 located at the center of the three supports. The structure of the first radiator extension 700 may be a coil structure.

The second support 320 is formed in front of the first support 310 and is disposed being separated from the first support 310. A second radiator 1300 is coupled to one side of the second support 320.

The third support 330 is formed in the rear of the first support 310 and is disposed being separated from the first support 310. A third radiator 1500 is coupled to one side of the third support 330.

The present disclosure forms three supports 310, 320, 330 in the first antenna frame 300 so that elements for radiation are coupled to each support 310, 320, 330.

Conventional antenna structures employ a structure in which substrates are disposed vertically on a substrate and then radiators are coupled to the vertical substrates. However, the structure of arranging a plurality of substrates vertically on the base substrate resulted in high manufacturing costs and performance degradation in various aspects, including the level of separation.

To address the problem above, the present disclosure couples the first antenna frame 300 and/or the second antenna frame 400 with multiple supports to the substrate and couples a radiator to each support.

In particular, the first antenna frame 300 of the present disclosure may be configured to have a structure suitable for implementing the AM/FM radiator operating in the low-frequency band. The low-frequency band AM/FM radiators require a considerable length for their functionality; traditionally, to ensure the appropriate length of the radiator, a PCB was placed vertically, and the meandering metal pattern formed on the PCB served as part of the radiator.

As described above, the structure of forming a metal pattern on the PCB incurs significant expenses and fails to provide relevant performance.

To solve this problem, the present disclosure couples the first radiator extension 700 to the first support 310 of the first antenna frame 300 and electrically connects the first radiator extension 700 to the first radiator 1100 to extend the electrical length of the first radiator 1100. The first radiator 1100 may be used as a radiator operating in the low-frequency band, such as the one used in the AM/FM frequency band.

One end of the first radiator extension 700 penetrates the first radiator coupling portion 340 and is connected to the first radiator 1100 to extend the electrical length of the first radiator 1100. The other end of the first radiator extension 700 is connected to the substrate 200. Specifically, according to one embodiment, the first radiator extension portion 700 may include a coil portion in the center of its body, an upward extension in the upper part of the coil portion, and a downward extension in the lower part of the coil portion. The coil portion may exhibit the coil shape of a standard spiral structure. The upward extension may extend in the vertical direction upward from the upper end of the coil portion. The downward extension may extend in the vertical direction downward from the lower end of the coil portion.

The first radiator extension 700 is coupled to the outer circumferential surface of the first support 310. The cross section of the first support 310 has a circular shape so that the first radiator extension portion 700 may be coupled thereto. The first radiator extension 700 may be coupled to the first support 310 by being inserting into the first support 310.

The upward extension of the first radiator extension 700 may pass through a hole formed in the first radiator coupling portion 340 and protrude toward the upper part of the first radiator coupling portion 340. The upward extension of the first radiator extension 700 may be electrically coupled to the first radiator 1100 and function as part of the radiator for the low-frequency band.

The downward extension of the first radiator extension 700 is coupled to the substrate 200 and receives feed signals from feed lines formed on the substrate 200.

The present disclosure reduces costs, adjusts frequency bands, and ensures stable operations by employing a structure in which the first radiator extension 700 is coupled to the first support 310 of the first antenna frame 300, and the first radiator extension 700 and the first radiator 1100 together function as a radiator.

According to a preferred embodiment of the present disclosure, a fixing hook may be formed on the bottom of the first support 310, and the fixing hook may fix the first radiator extension 700. The safety of combining the first radiator extension 700 and the first support 310 may be improved by using the fixing hook.

A through hole 1000 is formed in a predetermined area of the first radiator 1100 in response to the hole formed in the first radiator coupling portion 340, and the upward extension of the first radiator extension 700 protrudes through the through hole 1000 and is coupled to the first radiator 1100.

Meanwhile, a plurality of heat transfer prevention holes 1002 are formed around the through hole 1000. According to one embodiment of the present disclosure, heat transfer prevention holes 1002 may be formed around the through hole 1000 on the top, bottom, left, and right sides of the through hole 1000. It should be obvious to those skilled in the art that the number and arrangement of the heat transfer prevention holes may be changed depending on the specific environment requirements.

The heat transfer prevention hole 1002 is formed to minimize heat loss occurring during the soldering process. Soldering the first radiator and the upward extension of the first radiator extension 700 may lead to an increase of the soldering time due to heat loss, and the heat transfer prevention hole 1002 is formed to prevent the soldering time from being increased.

In the following, the soldering process is described. Soldering is performed between the first radiator 1100 and the upward extension of the first radiator extension 700 with the upward extension protruding through the through hole, and the first radiator extension 700 is electrically coupled to the first radiator 1100.

The first radiator extension 700 and the first radiator 1100 function together as a radiator, and the electrical length required for the operation as a low-frequency radiator may be secured by the first radiator extension 700.

The first radiator 1100 may be distinguished by the slits 1110 formed on both sides of the central portion of its body.

The first radiator extension 700 has a significant inductance component, and the required capacitance may be obtained by the slits 1110 of the first radiator 1100.

Referring to FIG. 4, the second radiator 1300 according to one embodiment of the present disclosure has a feeding point 1510 formed in its lower part and is coupled to the feed line of the substrate 200. The second radiator 1300 may have a loop shape; however, the present disclosure is not limited to the specific shape. The productivity is high when the second radiator 1300 adopts a loop shape, since the loop shape eliminates the need for a matching stub structure.

According to one embodiment, the second radiator 1300 may be a radiator that transmits and receives signals in the 5G band. However, the frequency band supported by the second radiator 1300 is not limited to the specific frequency band above.

With reference to FIGS. 3 to 5, the coupling structure between the second radiator 1300 and the second support 320 and the structure of the second support 320 will be described. The second support 320 includes a second radiator fitting portion 350 protruding forward. The second radiator fitting portion 350 includes a hook shape extending upward to be coupled with the second radiator 1300. To couple the second radiator 1300 to the second support 320, the second radiator 1300 may be inserted into the hook shape of the second radiator fitting portion 350. The second radiator fitting portion 350 restricts the vertical movement of the second radiator 1300 and prevents the second radiator 1300 from shaking in all directions.

The second support 320 may include a horizontal fixing portion 360 and a substrate fixing portion 370.

The horizontal fixing portion 360 is elongated in the horizontal direction (left and right directions) and is arranged to support the inner surface of the second radiator 1300, thereby limiting the horizontal movement of the second radiator 1300. The second radiator 1300 remains stable during vehicle operation as it is securely fixed by the horizontal fixing portion 360, the feeding point 1510, and the second radiator insertion portion 350, resisting the rattling noise or vibrations.

The substrate fixing portion 370 may protrude from the horizontal fixing portion 360 toward the substrate 200 and be coupled to the substrate 200. A first hook 420 is formed at the end of the substrate fixing portion 370. The substrate fixing portion 370 is coupled to the substrate 200 using the first hook 420. When coupling the first support 310 to the substrate 200, the first hook 420 functions to hold the first support 310 and the substrate 200 in the correct position so that they may be easily coupled to each other. Detailed descriptions thereof will be provided later.

In what follows, with reference to FIG. 2 and FIGS. 6 to 9, a coupling structure between the third radiator 1500 and the third support 330 will be described.

The third radiator 1500 according to one embodiment of the present disclosure may form multiple coupling structures and a branch-type pattern structure with a complex pattern (see FIG. 6). Due to this structure, the third radiator 1500 of the present disclosure may secure a wider frequency band (2.7 to 4 GHz) than the prior art using a truncated loop-shaped radiator.

A feeding point 1550 is also formed in the lower part of the third radiator 1500 and is coupled to the feed line formed on the substrate 200.

According to one embodiment, the third radiator 1500 may be a radiator that transmits and receives signals in the LTE band. However, this is only an example, and the frequency band supported by the third radiator 1500 is not limited to the specific example.

The third radiator 1500 is coupled to the third support 330. Specifically, a plurality of protrusions protruding toward the rear are formed in the rear of the first antenna frame 300 (see FIG. 2). The plurality of protrusions are arranged to be separated from each other, including a first protrusion 210, a second protrusion 220, a third protrusion 230, and a fourth protrusion 240 arranged from the top to the bottom of the first antenna frame 300 along the height direction. The third radiator 1500 is firmly fixed by the protrusions 210, 220, 230, and 240 and remains stable against impacts generated during driving. Each of the plurality of protrusions 210, 220, 230, 240 is coupled with portions 215, 225, 235, 245 of the third support 330, respectively.

Referring to FIG. 8, a portion of the rear of the first antenna frame 300 and a portion of the third radiator 1500 may form a predetermined inclination. For example, a portion of the rear of the first antenna frame 300 and at least a portion of the third radiator 1500 may be formed to be inclined with respect to the center line 410 of the first support. Since the rear of the first antenna frame 300 and the third radiator 1500 have a predetermined inclination, a sufficient separation distance may be secured between radiators disposed in the vehicle antenna. The shape and inclination of the rear of the first support 310 and the third radiator 1500 shown in FIG. 8 are only an example, and the present disclosure is not limited by the drawing.

According to one embodiment, the rear of the first antenna frame 300 and at least a portion of the third radiator 1500 may be formed to exhibit an increasing inclination away from the center line 410 of the first support as they descend from the top to the bottom. In other words, since the first antenna frame 300 of the present disclosure has a structure in which the gap between radiators gradually increases from the top to the bottom, a greater separation distance is obtained between the individual radiators, and thus, higher antenna performance may be achieved compared to existing disclosures in which the gap between radiators gradually decreases from the top to the bottom.

According to one embodiment, the distance from the center line 410 of the first support to the second protrusion 220 may be formed to be longer than the distance from the center line 410 of the first support to the first protrusion 210.

According to one embodiment, the distance from the center line 410 of the first support to any one of the second protrusion 220 to the fourth protrusion 240 may all be formed to be the same.

According to one embodiment, the distance from the center line 410 of the first support to any one of the first protrusion 210 to the fourth protrusion 240 may be formed to increase from the first protrusion 210 to the fourth protrusion 240.

In addition to the examples described above, it should be clearly understood by those skilled in the art that the inclinations and the coupling of the third radiator 1500 and the third support 330 may be achieved in various ways.

In what follows, the first support leg 1700 and the second support leg 1800 will be described with reference to FIG. 9.

The first support leg 1700 formed on the second support 320 is formed by bending one side of the second support 320 and extending the bent portion in a direction parallel to the substrate 200. A flange 1900 is formed on the first support leg 1700. A screw hole is formed in the flange 1900.

The second support leg 1800 formed on the third support 330 is also formed by bending one side of the third support 330 and extending the bent portion in a direction parallel to the substrate 200. A flange 1900 is also formed on the second support leg 1800, and a screw hole is formed in the flange 1900.

According to one embodiment, the first support leg 1700 of the second support 320 may be formed by being extended in the left direction.

According to one embodiment, the second support leg 1800 of the third support 330 may be formed by being extended in the right direction.

In what follows, flanges 1900 will be described with reference to FIG. 10. The flanges 1900 formed at the ends of the first support leg 1700 and the second support leg 1800, respectively, are seated on the upper surface of the substrate 200 and coupled to the substrate 200.

According to one embodiment, several flange grooves 1910 for seating the flanges 1900 are formed in the substrate 200. The flange grooves 1910 are formed by recessing downward from the upper surface of the substrate 200 to a specific depth. Flanges 1900 formed at the end of the first support leg 1700 and at the end of the second support leg 1800 respectively are seated in the respective flange grooves 1910. Here, the thickness of the flanges 1900 and the depression depth of each of the flange grooves 1910 are the same. In other words, when the flanges 1900 are completely seated in the flange grooves 1910, the upper surfaces of the flanges 1900 in contact with the upper surface of the substrate 200 and the first screws 1470 are aligned at the same height in the height direction. Here, the first screws 1470 penetrate each of the flanges 1900, each of the flange grooves 1910, and one surface of the base 100 and fasten them to each other. The second screws 1480 penetrate the substrate 200 and one surface of the base 100 and fasten them to each other. The first screws 1470 and the second screws 1480 may have the same size, shape, and length. In other words, the first screws 1470 and the second screws 1480 may be completely the same screws. As described above, the first screws 1470 and the second screws 1480 may be made of the same screws because the thickness of the flanges 1900 and the depression depth of each of the flange grooves 1910 are the same.

To described in more detail, after the flanges 1900 of the support legs 1700, 1800 are seated in the flange grooves 1910 of the substrate 200, the first screws 1470 may be fastened. When the first screws 1470 and the second screws 1480 are coupled to the substrate 200, the positions of the first screws 1470 and the second screws 1480 in the height direction are the same. Since the horizontal heights of the upper surface of the substrate 200 and the flanges 1900 seated on the substrate 200 are the same, the screw specifications may be unified. When screw specifications are unified, manufacturing costs may be reduced, and the related manufacturing process may be simplified.

In what follows, a process of coupling the first antenna frame 300 to the substrate 200 will be described with reference to FIG. 10.

The substrate 200 may be disposed on top of the base 100 (process 1). The patch antenna 500 may be coupled to the upper part of the substrate 200 (process 2). The second radiator 1300 is coupled and fixed to the horizontal fixing portion 360, the substrate fixing portion 370, and the second radiator fitting portion 350 formed on the first antenna frame 300 (process 3). The first hook 420 of the substrate fixing portion 370 is coupled to the substrate 200 to fix the first antenna frame 300 to the substrate 200 (process 4). The flanges 1900 formed on the first antenna frame 300 are seated in the flange grooves 1910 (process 5). In other words, the first hook 420 coupled in the process 4 serves as a guide for performing the process 5. In other words, processes 4 and 5 align the positions of the substrate 200 and the first antenna frame 300 before fastening the first screws 1470 in process 6, which will be described later.

The first screws 1470 are fastened to penetrate each of the flanges 1900, each of the flange grooves 1910, and one surface of the base 100 (process 6). In other words, when the flanges 1900 are seated in process 5, the heights of the top surface of the flanges 1900 and the top surface of the substrate 200 are the same; therefore, in the process 6, the first antenna frame 300, the substrate 200, and the base 100 may be screwed together by passing the first screws 1470 to the same depth as the second screws 1480 penetrate the substrate 200.

The order of the processes described above may be changed as long as the change of order does not cause contradiction. Also, the method for coupling the second antenna frame 400 may also be performed according to the method for coupling the first antenna frame 300 with necessary changes made.

In a typical vehicle antenna, the structure installed on the substrate is first coupled to the substrate, and then the substrate and the base are coupled using a separate coupling structure. However, the present disclosure avoids the multi-stage coupling method and combines the antenna frames 300, 400, the substrate 200, and base 100 at the same time to reduce manufacturing costs.

In what follows, the second antenna frame 400 will be described. The descriptions of the second antenna frame 400 that overlap those of the first antenna frame 300 will be briefly summarized or replaced with the descriptions of the first antenna frame 300.

The second antenna frame 400 may include a fourth radiator coupling portion 1490 that supports the lower part of the fourth radiator 1600. The fourth radiator 1600 may be coupled to the upper part of the fourth radiator coupling portion 1490 located on the upper part of the second antenna frame 400. A slit may be formed in the fourth radiator 1600. The fourth radiator 1600 may be distinguished by the slit.

The second antenna frame 400 may include the fourth support 610 to the sixth support 630 that extend downward from the lower part of the fourth radiator coupling portion 1490 to be coupled to the substrate 200.

The fifth support 620 is disposed in front of the fourth support 610, and the sixth support 630 is disposed in the rear of the fourth support 610.

A fourth radiator extension 750 surrounding the outer circumferential surface may be disposed on the fourth support 610. One end of the fourth radiator extension 750 may penetrate the fourth radiator coupling portion 1490 and extend the electrical length of the fourth radiator 1600 by being connected to the fourth radiator 1600. The other end of the fourth radiator extension 750 is coupled to the substrate 200.

The fifth support 620 may include a third support leg 1850, which is parallel to the substrate 200 but extends forward, and the sixth support 630 may include a fourth support leg 1860, which is parallel to the substrate 200 but extends to the right.

The flanges 1900 formed respectively at the end of the third support leg 1850 and at the end of the fourth support leg 1860 are structured to be seated to any one of the flange grooves 1910 formed by recessing downward from the upper surface of the substrate 200.

As in the first antenna frame 300, the thickness of the flanges 1900 and the depression depth of the flange grooves 1910 of the second antenna frame 400 are the same. The second antenna frame 400 is also coupled to the substrate 200 by the first screws 200 that penetrate each of the flanges 1900, each of the flange grooves 1910, and one surface of the base 100.

In the descriptions of the process for coupling constituting elements of the vehicle antenna according to the present disclosure, processes are described as being sequentially executed, which is merely an illustrative explanation of the technical principles of one embodiment of the present disclosure. In other words, since a person skilled in the art to which one embodiment of the present disclosure belongs may generate various modifications and variations of the present disclosure by changing the execution order described in the drawings or performing one or more of the processes in parallel without departing from the essential characteristics of one embodiment of the present disclosure, the drawings are not limited to a sequential order of execution.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An antenna for a vehicle comprising:
a base;
a substrate disposed on an upper part of the base and on which feed lines are formed;
a first antenna frame coupled to one side of an upper part of the substrate; and
a first radiator disposed on an upper part of the first antenna frame and in which slits are formed,
wherein the first antenna frame includes:
a first radiator coupling portion supporting a lower part of the first radiator; and
a plurality of supports extending downward from the first radiator coupling portion and coupling to the substrate,
wherein the plurality of supports include a first support, a second support and a third support,
the second support is disposed in a front of the first support,
the third support is disposed in a rear of the first support,
the first support is equipped with a first radiator extension surrounding an outer circumferential surface of the first support, and
one end of the first radiator extension penetrates the first radiator coupling portion and is coupled to the first radiator to extend an electrical length of the first radiator, and the other end is coupled to the substrate,
wherein a second radiator is coupled to the second support, and
a third radiator is coupled to the third support,
wherein the third radiator is coupled to a plurality of protrusions protruding toward the rear disposed in the rear of the first antenna frame,
wherein the plurality of protrusions include a first protrusion, a second protrusion, a third protrusion and a fourth protrusion arranged to be separated from each other from a top to a bottom of the first antenna frame along a height direction, and a distance from the center line of the first support to the second protrusion is longer than a distance from the center line of the first support to the first protrusion.

2. The antenna of claim 1, wherein the second radiator has a single loop shape, and a protruding feeding point in the lower part thereof is coupled to the substrate.

3. The antenna of claim 1, wherein distances from the second to fourth protrusions to the center line of the first support are all the same.

4. The antenna of claim 1, wherein at least a portion of the third radiator is formed to be inclined with respect to the center line of the first support.

5. The antenna of claim 4, wherein the inclined portion of the third radiator is formed to exhibit an increasing inclination away from the center line of the first support as it descends from the top to the bottom.

6. The antenna of claim 1, wherein the second support includes a second radiator fitting portion protruding forward, and
the second radiator fitting portion includes a hook shape extending upward to be coupled with the second radiator and restricts a vertical movement of the second radiator.

7. The antenna of claim 6, wherein the second support further includes:
a horizontal fixing portion elongated in a horizontal direction and is arranged to support the inner surface of the second radiator, thereby limiting a horizontal movement of the second radiator; and a substrate fixing portion protruding toward the substrate from the horizontal fixing portion and being coupled to the substrate, wherein the substrate fixing portion is coupled to the substrate using a first hook formed on one end of the substrate fixing portion.

8. The antenna of claim 1, wherein the second support includes a first support leg that is parallel to the substrate and extends in a left direction, and the third support includes a second support leg that is parallel to the substrate and extends in a right direction.

9. The antenna of claim 8, wherein flanges formed respectively at the end of the first support leg and at the end of the second support leg are seated in any one of flange grooves formed by recessing downward from an upper surface of the substrate, and thickness of the flanges and depression depth of the flange grooves are the same.

10. The antenna of claim 9, further comprising:

first screws penetrating each of the flanges, each of the flange grooves, and one surface of the base and fastening them to each other; and second screws penetrating the substrate and one surface of the base and fastening them to each other, wherein the first screws and the second screws have the same size, shape, and length.

11. The antenna of claim 10, wherein positions of the first screws and the second screws in a height direction are the same.

12. The antenna of claim 1, further comprising:

a patch antenna disposed in front of the first antenna frame and coupled to the substrate;

a second antenna frame disposed in front of the patch antenna and coupled to the substrate; and a fourth radiator disposed in an upper part of the second antenna frame and in which slits are formed, wherein the second antenna frame includes:

a fourth radiator coupling portion supporting a lower part of the fourth radiator; and fourth to sixth supports excluding downward from the fourth radiator coupling portion and coupled to the substrate.

13. The antenna of claim 12, wherein the fifth support is disposed in front of the fourth support, the sixth support is disposed in rear of the fourth support, the fourth support is equipped with a fourth radiator extension, which surrounds an outer circumferential surface of the fourth support, wherein one end of the fourth radiator extension penetrates the fourth radiator coupling portion and elongates an electrical length of the fourth radiator by being connected to the fourth radiator, and the other end thereof is coupled to the substrate.

14. The antenna of claim 12, wherein the fifth support includes a third support leg that is parallel to the substrate and extends forward, and the sixth support includes a fourth support leg that is parallel to the substrate and extends in a right direction.

15. The antenna of claim 14, wherein flanges formed respectively at the end of the third support leg and at the end of the fourth support leg are structured to be seated to any one of flange grooves formed by recessing downward from the upper surface of the substrate, and the thickness of the flanges and the depression depth of the flange grooves are the same.

16. The antenna of claim 15, further comprising:

first screws penetrating each of the flanges, each of the flange grooves, and one surface of the base and fastening them to each other; and second screws penetrating the substrate and one surface of the base and fastening them to each other, wherein the first screws and the second screws have the same size, shape, and length; and the positions of the first screws and the second screws in a height direction are the same.

17. A method for manufacturing a vehicle antenna, the method comprising:

disposing a substrate on an upper part of a base;

coupling a patch antenna to an upper part of the substrate;

coupling a second radiator to a horizontal fixing portion, a substrate fixing portion, and a second radiator fitting portion formed in a first antenna frame;

fixing the first antenna frame to the substrate by coupling a first hook of the substrate fixing portion formed on the first antenna frame to the substrate;

seating flanges formed in the first antenna frame in flange grooves formed by recessing downward from an upper surface of the substrate; and fastening first screws to penetrate each of the flanges, each of the flange grooves, and one surface of the base.

18. An antenna for a vehicle comprising:

a base;

a substrate disposed on an upper part of the base and on which feed lines are formed;

a first antenna frame coupled to one side of an upper part of the substrate; and a first radiator disposed on an upper part of the first antenna frame and in which slits are formed, wherein the first antenna frame includes:

a first radiator coupling portion supporting a lower part of the first radiator; and a plurality of supports extending downward from the first radiator coupling portion and coupling to the substrate, wherein the plurality of supports include a first support, a second support and a third support, the second support is disposed in a front of the first support, the third support is disposed in a rear of the first support, the first support is equipped with a first radiator extension surrounding an outer circumferential surface of the first support, and one end of the first radiator extension penetrates the first radiator coupling portion and is coupled to the first radiator to extend an electrical length of the first radiator, and the other end is coupled to the substrate, wherein the second support includes a second radiator fitting portion protruding forward, and the second radiator fitting portion includes a hook shape extending upward to be coupled with a second radiator and restricts a vertical movement of the second radiator, wherein the second support further includes:

a horizontal fixing portion elongated in a horizontal direction and is arranged to support the inner surface of the second radiator, thereby limiting a horizontal movement of the second radiator; and a substrate fixing portion protruding toward the substrate from the horizontal fixing portion and being coupled to the substrate, wherein the substrate fixing portion is coupled to the substrate using a first hook formed on one end of the substrate fixing portion.

* * * * *